Oct. 25, 1960   R. W. GILBERT   2,958,036
MODULATOR
Filed Feb. 21, 1956
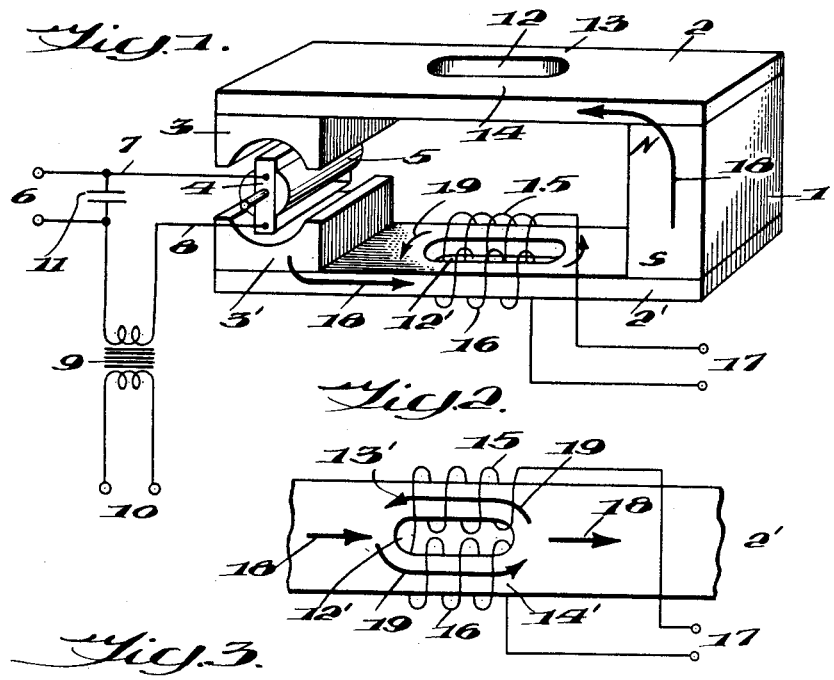
Fig. 1.
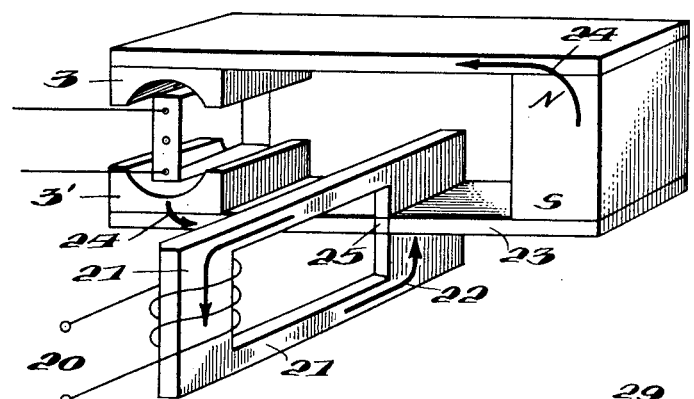
Fig. 2.
Fig. 3.
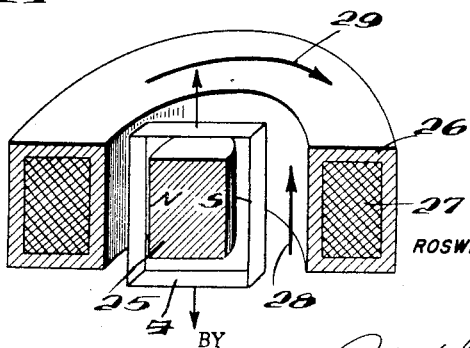
Fig. 4.
INVENTOR
ROSWELL W. GILBERT
Rudolph J. Lurich
ATTORNEY United States Patent Office 2,958,036
Patented Oct. 25, 1960

2,958,036

MODULATOR

Roswell W. Gilbert, Montclair, N.J., assignor, by mesne assignments, to Daystrom, Incorporated, Murray Hill, N.J., a corporation of New Jersey Filed Feb. 21, 1956, Ser. No. 566,867

2 Claims. (Cl. 323—53)

This invention relates to induction galvanometers broadly, and more particularly to induction galvanometers utilizing low-frequency varying flux to cross-modulate the main permanent field flux by cyclic saturation of a portion of the main flux path.

Induction galvanometers, of the class to which the present invention is directed, are disclosed in my issued United States Patents #2,486,641 and #2,650,348. In this type of instrument, in addition to the usual permanent magnet and pivoted coil responsive to D.-C. current, there is provided an alternating current coil for introducing a ripple or alternating component into the magnetic field flux. When the pivoted coil is deflected from its normal zero position by the flow of direct current therethrough, an alternating potential component proportional to the coil deflection angle and having a phase dependent upon the direction of coil displacement is induced in the movable coil. The induced alternating cmoponent is introduced into the load circuit by means of a transformer coupled to the direct current measuring circuit, and the energy amplification obtained, when the load impedance is matched to the coil impedance, is very high.

In the type of instrument disclosed in the prior art, the alternating magnetic flux is inpected directly across the air gap along with the unidirectional flux. Such instruments are designed for operation at relatively high frequency (about 200 kilocycles/second) with high magnetic flux velocity at low alternating flux densities, and a relatively open alternating flux path is appropriate. Satisfaction of the high density requirement by the direct injection of an alternating flux component requires an unreasonable amount of excitation power, particularly because of the air gap required to limit loss of the permanent flux. Similarly, at relatively high frequencies, the polepiece and core materials suited to the D.-C. flux are unsuited to the A.-C. component, and an insert structure as disclosed in my U.S. Patent #2,650,349 is required to carry the A.-C. flux.

Thus, as an improvement over the prior art, the present invention is directed to the provision of an induction galvanometer which will operate satisfactorily with low-frequency A.-C. excitation input. By eliminating the air gap presented to the varying excitation flux the amount of excitation power required is greatly reduced. Further, the use of low frequency excitation reduces the eddy current reaction of solid iron paths thereby eliminating the necessity of special inserts in the flux path. Similarly, by balancing the applied A.-C. excitation flux against itself, the permeability of the main permanent flux path may be varied without injection of any A.-C. flux directly along the main flux path.

Thus, a primary object of my invention is the provision of an induction galvanometer which is operable with low-frequency excitation.

A more specific object of my invention is the provision of an induction galvanometer, in which the alternating component of field flux is introduced at right angles to the main steady flux in the iron path thereof to modulate the main flux by nonlinear mixing.

Another object of my invention is the provision of an induction galvanometer in which the varying excitation flux periodically varies the permeability, and hence the reluctance, of the D.-C. flux path, imparting to the main D.-C. flux a ripple flux.

A further object of my invention is to impart a ripple flux upon the main steady flux of an induction galvanometer by means of a balanced, varying-excitation flux which cyclically varies the permeability of a portion of the main flux path and hence the reluctance of the steady flux path, the balancing being such that no varying excitation flux is injected directly along the main flux path within which the movable coil of the galvanometer rotates.

Other objects and advantages will become apparent from the following description when taken with the accompanying drawing illustrating several embodiments of the invention. It will be understood, however, that the drawings are for purposes of description and are not to be construed as defining the scope or limits of the invention, reference being had for the latter purpose to the appended claims.

In the drawings wherein like reference characters denote like parts in the several views:

Figure 1 is a diagrammatic, perspective view of one embodiment of the invention providing a parallel arrangement of the A.-C. flux with respect to the main D.-C. flux;

Figure 2 is a plan view of a portion of one yoke of the embodiment shown in Figure 1;

Figure 3 is a perspective view of a second embodiment which provides a transverse arrangement of the A.-C. flux with respect to the D.-C. flux; and Figure 4 is a sectional perspective view of a third embodiment of my invention which provides a cylindrical type of magnetic structure with a transverse arrangement of the A.-C. flux.

Referring now to Figures 1 and 2, the induction galvanometer comprises a permanent magnet 1 to which a pair of yoke members 2, 2', of soft iron, are cemented, welded or brazed. Secured to the free ends of the yoke members 2, 2' are soft iron pieces 3, 3', which have concave face surfaces. Pivotally secured in suitable bearings between the concave faces of pole members 3, 3' is a wire-wound movable coil 4 which is rotatable about a soft iron core 5. The opposite sides of the coil 4 are parallel and disposed in the air gaps formed between the cylindrical core surface and the concave faces of pole pieces 3, 3'.

The direct current input is applied to the input terminals 6 and to one terminal of coil 4 through conductor 7. The return lead 8 from the coil 4 contains the primary winding of transformer 9. The A.-C. output terminals 10 are connected to the secondary winding of the transformer 9. Shunting capacitor 11 provides an A.-C. return path to the coil 4.

One or both of the yoke members 2, 2' are provided with eliptical holes 12, 12' thus providing spaced arms upon which the A.-C. excitating windings are wound, only the lower such windings 15, 16 being shown in the drawings. The turns of the excitation windings 15, 16 are so arranged that the resulting alternating flux is additive in each yoke section, as shown by the arrows 19 in Figure 2, when the coil is connected to a source of alternating current as at 17.

The permanent magnet 1 establishes a main unidirectional flux as indicated by the arrows 18, the flux path extending from the north pole of the permanent magnet 1, longitudinally through yoke member 2 including the reduced portions 13 and 14, through pole piece 3, across the air gap containing one side of coil 4, through the core 5, across the air gap containing the other side of coil 4, through pole piece 3', yoke member 2' including reduced portions 13' and 14', and back to the south pole of the magnet 1. As shown in Figure 2, the exciting windings 15 and 16 produce a closed loop of flux 10 through the two parallel yoke sections 13', 14', the latter also carrying the main steady flux 18. During one half-cycle of A.-C. excitation voltage the A.-C. flux path, as indicated by the arrows 19, is created by the excitation coils 15 and 16. During the next half-cycle the varying flux path will be reversed and in the opposite direction to that shown by arrows 19. Since the portions of exciting flux loop 19 parallel to the main magnetic flux are in opposite directions in portions 13' and 14', the net effect is that the exciting flux is balanced out in the longitudinal direction with respect to the main flux. However, the components of the exciting flux at right angles to the main flux will have a modulating effect upon the main unidirectional flux. The varying excitation flux thereby modulates the permeability of the reduced portions 13' and 14' of the main flux path. Since during each half cycle the exciting flux is balanced with respect to the main flux path, no varying excitation flux is directly injected along the main flux path. Modulation occurs only by reason of the nonlinear permeability to flux density characteristic of ferro-magnetic materials. By designing the magnetic structure so that the main steady flux has a value which will establish a flux density in the magnetic material at a level corresponding to the knee of the B—H curve, any change in flux density will cause a reduction of the permeability of the magnetic material. Thus, as the excitation flux periodically varies, the permeability of reduced portions 13' and 14' will be periodically reduced, and the reluctance of the main steady flux path will be periodically increased. Hence, it follows that the main unidirectional flux between the pole pieces 3, 3' will have a periodically varying ripple thereon, which is necessary for proper operation of the induction galvanometer. Cross modulation of the main, unidirectional flux, as just described, is efficient because no air gap exits within the exciting flux path and a low order of A.-C. magnetization is effective. The A.-C. excitation demand is considerably less than is required in an arrangement wherein the alternating flux is injected directly across the flux gap within which the movable coil operates.

While in the preferred operation of the embodiment shown in Figures 1 and 2, the utilization of exciting coils in connection with both yoke members 2 and 2' is contemplated, a single coil on one yoke member may be utilized alone if desired.

In operation of my device, a D.-C. signal voltage is applied to the input terminals 6 resulting in an angular rotation of the movable coil 4. Since the flux across the air gap consists of the main steady flux modulated at its nonlinear portion by the ripple magnetic flux, an A.-C. voltage component will be induced in the movable coil, such component varying in magnitude with the amount of coil deflection from the normal, or zero, position and having a phase depending on the direction of coil rotation. A high order of amplification in the direct-current to alternating-current power conversion is effected.

In terms of end result, a cross modulation induction galvanometer differs from the direct injection type of instrument in that it is a second harmonic converter similar to most magnetic amplifier systems. Both positive and negative half-cycles of excitation current lower the flux, so the induced signal has a major frequency corresponding to the second harmonic of the excitation frequency, and ideally contains no fundamental first harmonic. In operating circuits this may be convenient or inconvenient, depending upon the availability of the second harmonic reference for demodulation after amplification. But when excitation is at line frequency, a second harmonic reference is obtainable from a power supply filter unit.

While the embodiment of my invention shown in Figures 1 and 2 utilizes the application of excitation flux parallel to the main flux, the embodiment disclosed in Figure 3 provides for the application of excitation flux transverse to the main flux. Referring to Figure 3, the A.-C. excitation voltage is applied to the terminals 20 of the exciting coil carried by the soft iron member 21. During one half cycle of the A.-C. voltage the exciting flux will flow through the member 21 in the direction of the arrow 22, and during the next half cycle the excitation flux will be reversed. The A.-C. flux passes through the yoke 23 in a direction transverse to the main D.-C. flux 24 passing longitudinally through the yoke. Again, if the main steady flux is such as to provide a flux density in the magnetic path at the knee of the B—H curve, the excitation flux 22 will modulate the main flux 24 on the nonlinear portion of the permeability curve. Thus, the permeability of portion 25 of the main flux path cut by the exciting flux path will be periodically reduced, the reluctance of the main steady flux path will be periodically increased, and a ripple component will be applied to the main steady flux across the pole pieces 3, 3'.

The principle of cross-modulating flux may readily be applied to core magnet structures, as shown in Figure 4, which provides a method of modulation similar to that of the transverse system of Figure 3.

The external cylindrical yoke which constitutes the normal return path for the flux of a core magnet 25 consists of a soft-iron shell 26 with an enclosed annular space within which the exciting coil 27 is wound. The axis of the exciting coil 27 is normal to the geometric axis (as distinguished from the pivot axis) of the movable coil 4. The A.-C. flux path 28 is, then, parallel to the pivot axis of the movable coil and transverse to the permanent field return path 29. The structure is compact, efficient, self-sheilded, and simple in parts and assembly.

Thus, it may be seen that my invention discloses the application of a varying magnetic excitation flux transverse to the direction of the main steady flux path, to periodically vary the permeability of a portion of the main steady flux path, and hence its reluctance, whereby a ripple flux is applied across the gap within which the pivoted movable coil operates.

Having now described several specific embodiments of my invention, those skilled in this art will find no difficulty in making changes and modifications to meet the requirements of specific applications. Such changes and modifications may be made without departing from the scope and spirit of the invention as set forth in the following claims.

I claim:
1. A modulator comprising a transversely-magnetized permanent magnet core; a soft-iron yoke encircling the core, said yoke being in the form of a hollow ring having an inner wall spaced from the core to form a flux gap; a wire-wound movable coil pivotally mounted for rotation in said flux gap; and an exciting coil disposed within the yoke and adapted for connection to a source of A.-C. voltage, the axis of the exciting coil coinciding with the rotational axis of the movable coil.

2. A modulator comprising a transversely-magnetized permanent magnet core; a soft-iron yoke encircling the core, said yoke being in the form of a hollow ring having an inner wall spaced from the core to form a flux gap; a wire-wound movable coil pivotally mounted for rotation in said flux gap; and an exciting coil disposed within the yoke and adapted for connection to a source of A.-C. voltage, the axis of the exciting coil being normal to the geometric axis of the said movable coil.

References Cited in the file of this patent

UNITED STATES PATENTS

| 2,405,049 | Pattee | July 30, 1946 |
| 2,486,641 | Gilbert | Nov. 1, 1949 |
| 2,648,815 | Hassler | Aug. 11, 1953 |